March 31, 1964     E. C. LARY ETAL     3,127,528
MAGNETOHYDRODYNAMIC GENERATOR

Filed Oct. 3, 1960     2 Sheets-Sheet 1

CONTRACTION

EXPANSION

INVENTORS
EDMUND C. LARY
RUSSELL G. MEYERAND JR.
BY Leonard F. Weklich
ATTORNEY

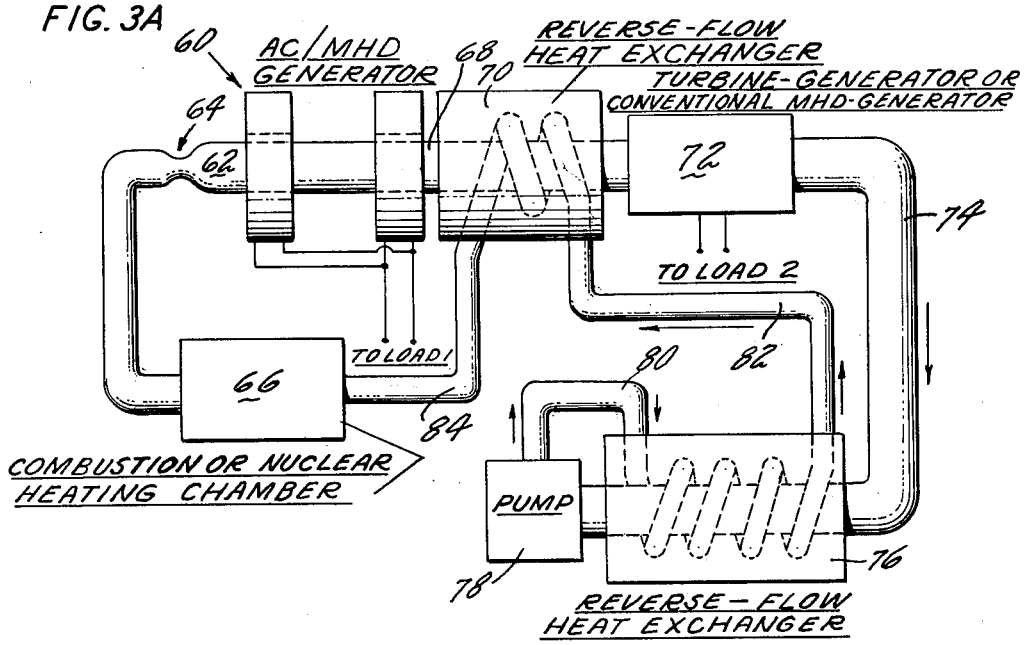
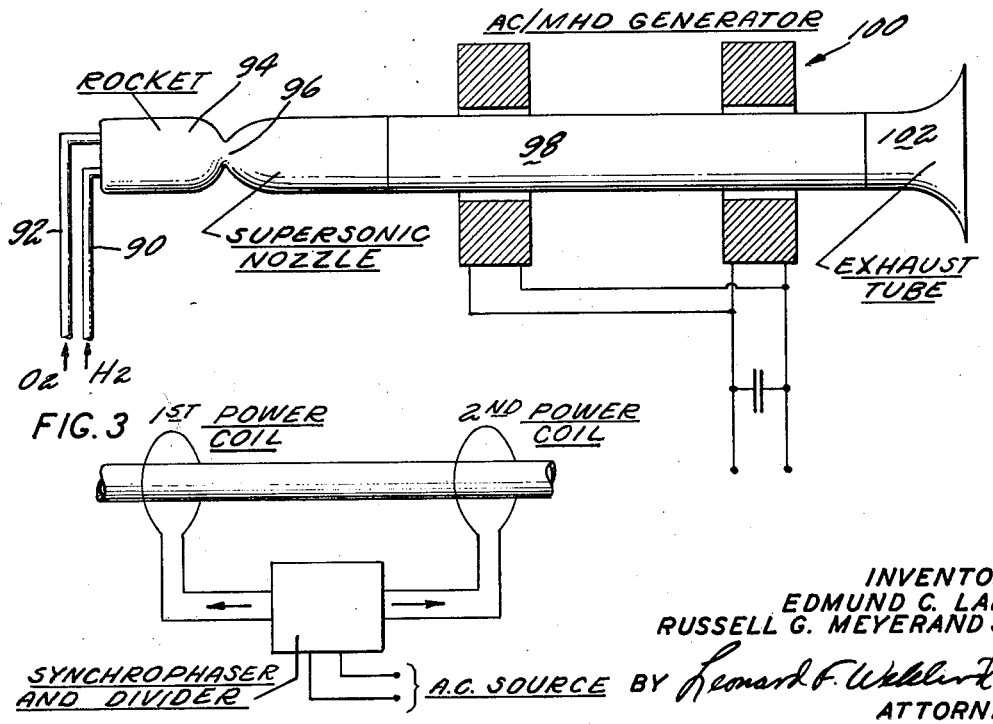

3,127,528
MAGNETOHYDRODYNAMIC GENERATOR
Edmund C. Lary, Vernon, and Russell G. Meyerand, Jr.,
East Hartford, Conn., assignors to United Aircraft
Corporation, East Hartford, Conn., a corporation of
Delaware
Filed Oct. 3, 1960, Ser. No. 60,129
15 Claims. (Cl. 310—11)

This invention relates to a magnetohydroelectric generator and more specifically to a generator utilizing a high temperature supersonic fluid stream for generating A.C. current. Most current magnetohydroelectric generators are capable of generating direct current; however, the problem of obtaining alternating current has presented a number of problems, especially as involves the current emission and temperature limitations inherent with the use of electrodes.

Therefore the primary object of this invention is to provide a magnetohydroelectric generator which can directly generate alternating current without employing electrodes.

It is a further object of this invention to utilize an extremely high temperature ionized gas stream, which is moved by a pressure differential at supersonic velocity through a duct and subjected to electromagnetic oscillations of a specific frequency to produce a series of bunched, conductive particles or bits. Subsequently the bits are subjected to a second electromagnetic oscillation of the same frequency in which electrical A.C. energy is extracted from the flow by its interaction with the external circuit producing the oscillation. A part of the electrical energy so derived is boot-strapped to produce the first oscillations.

These and other objectives of this invention will become readily apparent from the following detailed description of the drawings in which:

FIG. 3 is a schematic illustration of a pump version of this invention;

FIG. 3A is a schematic illustration of a typical closed cycle utilizing this invention; and FIG. 4 is a typical open-cycle system utilizing this invention.

Figure 1:
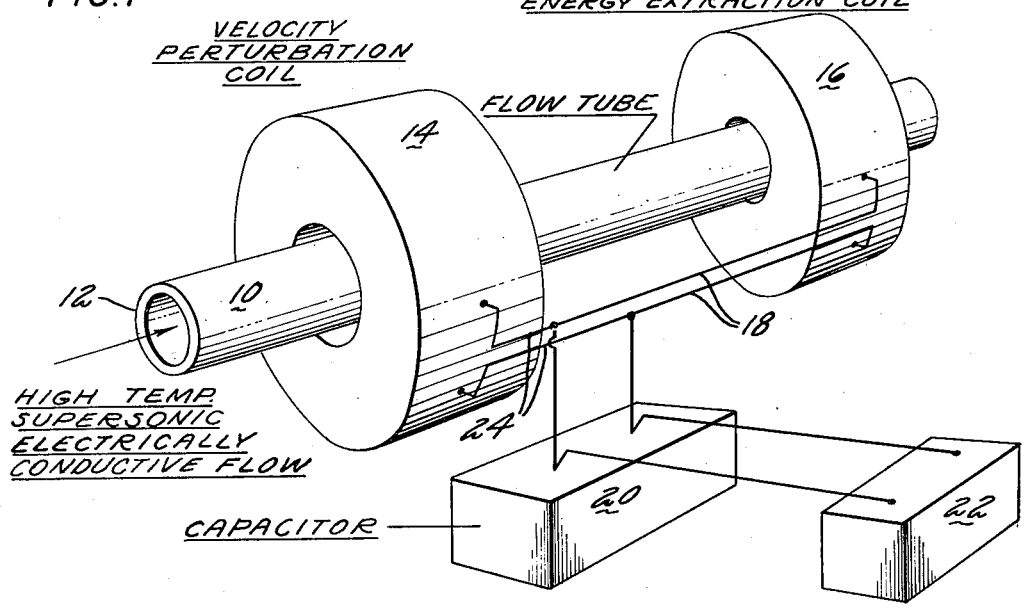
FIG. 1 is a schematic perspective illustration of a generator according to this invention.

As seen in FIG. 1, a main duct 10 is provided at its inlet 12 with an extremely high-temperature supersonic flow of an electrically conducting fluid. This flow of fluid passes through a first velocity perturbation coil 14 which imposes an oscillataing restricting and accelerating force on the steady stream to induce perturbations in the flow or create segregated or semi-segregated bits of conductive fluid. This flow then passes through an energy extraction coil 16 which, by proper phasing, extracts an A.C. energy from the fluid. The energy extraction process is one in which some of the velocity and heat of the main fluid stream are extracted by the interaction with the oscillating magnetic field of the coil. The extracted energy is collected by suitable lines 18 which lead to a suitable capacitor and control 20 which, in turn, provides an A.C. current to an A.C. load 22. A portion of the current so generated, but a relatively small amount thereof, is tapped off at 24 to in turn drive the coil 14 in a boot-strap arrangement.

The physics of this arrangement is quite analogous to that in a conventional microwave klystron. In the latter, an electron beam is utilized, rather than a fluid flow of the magnetohydrodynamic type, and the D.C. energy of the electron beam is converted into A.C. energy by the interaction with an electronic field.

However, the energy extraction coil operates by MHD interaction, not electrostatic as in a klystron. The interaction between a magnetic field generated by an external coil and a charge neutralized conducting is a well known phenomenon and does not rely on an unbalance or charge for the interaction. For example, see the publication "Project Sherwood—The U.S. Program in Controlled Fusion, by Amasa S. Bishop and published in 1958 by Addison-Wesley Publishing Co., Inc. On page 125 thereof, a device is described in which magnetic fields generated by external coils move and compress a slug of charge neutralized plasma from one region of the device to another.

A similar experiment is also described in the periodical "Physics of Fluids," vol. 2, No. 4, issue of July–August 1959.

Reference may also be had to the publication "The Plasma in a Magnetic Field" by Dr. Landshoff and published in 1958 by Stanford University Press where on page 88 the interaction of an externally produced magnetic field with a neutral plasma is discussed.

Figure 2:
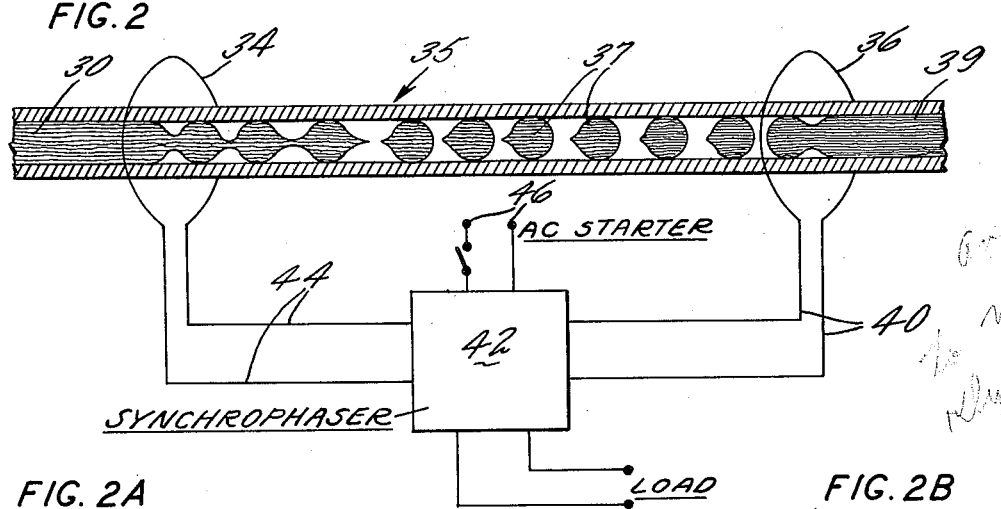
FIG. 2 is a schematic and diagrammatic illustration of the operation of the A.C. generator.
Figure 2A:
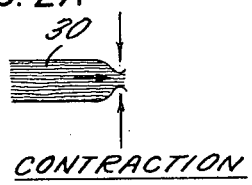
FIGS. 2A and 2B are diagrammatic illustrations of the forces acting on the ionized stream at the chopping and generating stations.
Figure 2B:
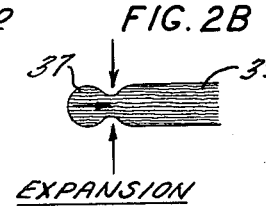

As better seen in FIG. 2, a high temperature supersonic fluid flow is injected at 30 such that it is in an ionized and conductive state. The coil 34 induces a pulsed magnetic field which produces a force with components transverse and parallel to the axis of fluid flow. This force is in the form of a constrictive action which tends to break up the conductive fluid into deformed flow, which, in the intermediate region 35, can be pictured as assuming the form of particles or bits of conductive fluid (FIG. 2A). The bits 37 may or may not completely separate from each other due to the action of the coil, which endows adjacent fluid elements with a differential momentum, the coasting action of which produces the bunching. The bits 37 are then exposed to a second oscillataing magnetic field which is provided by means of an extractor coil 36. The bits, or denser elements of fluid, force a dispeacement of the magnetic flux, exciting an induced E.M.F. in the extractor coil. The fluid thereby yields energy to the circuit of the coil, if the proper phase is maintained between the current flow in the coil and the E.M.F. In particular, the magnetic field created by the coil 36 is synchronized so that there is an expanding magnetic field just at the right moment where an electrically conductive bit 37 is passing through. This expansion process yields electrical power to the coil 36 by the induction of the oscillating E.M.F., such that a pulsating current is provided in the lines 40. Due to the growth of the perturbations in the coasting period between the two coils, an amount of electrical energy may be extracted at the second coil, which exceeds the electrical input energy at the first coil. A synchrophaser and control are provided to not only control the amount of current going to the pulsing coil 34 via the lines 44, but to also control the phase of the pulsations of the coils 34 and 36. An A.C. starting circuit may be provided, as for example at 46, to provide the initial input to the first coil.

In either FIGS. 1 or 2 it will be apparent that by alteration of the relative phase of the second coil and the density wave (working fluid perturbation) the same arrangement could be used to increase the kinetic energy of the flow by introducing power at the second coil, as shown in FIG. 3. The machine then acts as a fluid pump rather than as a generator. A divider and synchrophaser feeds A.C. power to both coils as shown. The pump application would provide a possible means of electrical propulsion for space flight applications, for example.

FIG. 3A shows a typical closed-cycle system embodying this invention. Thus an A.C. magnetohydroelectric generator is generally indicated at 60 and may be of the type disclosed in FIGS. 1 and 2. The generator 60 at its inlet end 62 includes a supersonic nozzle 64 to insure a supersonic velocity at the entrance 62. An adequate source of heat is also required to insure that the fluid is of sufficient high temperature and hence a suitable form of combustion or nuclear heating device 66 is provided upstream of the nozzle 64. A pump 78 is provided to maintain the pressure differential necessary for accelerating the fluid in the nozzle and overcoming the pressure drop due to the energy extraction in the region of the extractor coil.

The generator 60 has an outlet 68 which leads to a reverse flow regenerative-type of heat exchanger 70. The main working fluid, after leaving the heat exchanger 70, is passed through a second magnetohydroelectric generator 72. As an alternative, the heat exchanger may be replaced by a conventional magnetohydrodynamic generator or a turbine generator for extracting further energy from the stream and hence reducing its temperature. The fluid from the generator 72 flows through a conduit 74 through a second regenerative heat exchanger 76 and then to a pump 78. The pump may compress the fluid isothermally or may involve cooling of the fluid to maintain the outlet temperature equal to the inlet temperature. The outlet from the pump communicates with a conduit 80 which directs the fluid flow through the heat exchanger 76 to the line 82, then to the heat exchanger 70 and the line 84 leading to the heat source or heating chamber 66. Heating of the fluid may be achieved through combustion, nuclear processes, or other appropriate schemes.

FIG. 4 illustrates a typical embodiment of this invention in an open-fluid cycle. Herein a fuel and oxidizer, such as hydrogen and oxygen, may be led via the lines 90 and 92 to a suitable rocket combustion chamber 94. The combustion process provides the necessary heat source with exhaust gases being the working fluid, which is then passed through a supersonic nozzle 96 and led into the main generator region 98. The magnetohydroelectric generator 100 may be the same as previously described, but the outlet end of the working duct is provided with a suitable exhaust nozzle 102.

It will be apparent that as a result of this invention a reasonably efficient and extremely simple means has been provided for extracting A.C. energy directly from a high energy supersonic stream without the employment of electrodes. Electrical energy is extracted from the flow without the necessity of electrodes, which limit the current flow, cause losses, and present a materials problem, as yet unsolved. Also this invention is readily adaptable to high frequency A.C. power generation, as well as the conventional 60 cycle. Furthermore, by adding energy to the system, a pumping or acceleration cycle can be achieved by working on the fluid at the expense of electrical energy.

Although several embodiments of this invention have been illustrated and described herein, it will be apparent that various changes and modifications may be made in the construction and arrangement of the various parts without departing from the scope of this novel concept.

What is desired by Letters Patent is:

1. A magnetohydroelectric generator comprising an elongated duct forming a main passage, means for inducing a flow of an electrically conductive gaseous fluid stream through said duct at supersonic velocity, a first means adjacent said duct for inducing a pulsating magnetic field which passes through the fluid stream to create intermittent bunching of the fluid in said stream, thereby providing spaced bits or perturbations which travel in a downstream direction, a second means for inducing a second magnetic field passing through the fluid stream and located a predetermined distance downstream of said first-mentioned field-producing means, said bits passing through said second field and producing pulsating energy, and means for extracting said energy.

2. A magnetohydroelectric generator comprising an elongated duct forming a main passage, means for inducing a flow of high-temperature electrically conductive gaseous fluid stream through said duct at supersonic velocity, a first means adjacent said duct for inducing a pulsating magnetic field which passes through the fluid stream to create intermittent bunching of the fluid in said stream, thereby providing spaced fluid bits or perturbations which travel in a downstream direction, a second means for inducing a second magnetic field passing through the fluid stream and located a predetermined distance downstream of said first-mentioned field-producing means, the flow of said bits through said second magnetic means inducing a flow of pulsating electric current, and means receiving said current.

3. A magnetohydroelectric generator comprising an elongated duct forming a main passage, said duct being formed of thermal and electrical insulating material, means for inducing a flow of a high-temperature electrically conductive gaseous fluid stream through said duct at supersonic velocity, a first means adjacent said duct for inducing a pulsating magnetic field which passes through the fluid stream to create intermittent bunching of fluid in said stream, thereby providing spaced fluid bits which travel in a downstream direction, a second means for inducing a second magnetic field passing through the fluid stream and located a predetermined distance downstream of said first-mentioned field-producing means, the passage of said bits through said second field inducing an alternating current, means for extracting said current, and means for feeding at least a portion of said current to said first means.

4. A generator according to claim 3 wherein said duct is formed of thermal and electrical insulating material.

5. A magnetohydroelectric generator including an elongated electrically insulated duct, a source of high-temperature gaseous fluid, means for conducting said fluid from said source to said duct at supersonic velocity to provide an electrically conductive stream, a first coil providing a first magnetic field passing through said stream, means for pulsing said first magnetic field to induce in said stream a flow having pulsed characteristics, a second coil downstream of said first coil and providing a second magnetic field which intercepts said pulsed flow, said second magnetic field being at least partially displaced by said pulsed flow to induce in said second coil a pulsed electromotive force, and means receiving the current produced by said electromotive force.

6. A generator according to claim 5 including means connecting said first and second coils to induce pulsations in said first coil.

7. A generator according to claim 5 including means for starting the pulsations in said first coil.

8. A generator according to claim 5 including means for coordinating the current pulsations in said coils.

9. A magnetohydroelectric generator including an elongated electrically insulated duct having an inlet and outlet, a source of high-temperature gaseous fluid including a fluid heating device, means for conducting said fluid from said source to said duct at supersonic velocity to provide an electrically conductive stream, a first coil providing a first magnetic field passing through said stream, means for pulsing said first magnetic field to induce in said stream a flow having pulsed characteristics, a second coil downstream of said first coil and providing a second magnetic field which intercepts said pulsed flow, said second magnetic field being at least partially displaced by said pulsed flow to induce in said second coil a pulsed electromotive force, load means receiving current produced by said electromotive force, and a pump for pumping said flow from said outlet to said source.

10. A generator according to claim 9 including means located downstream of said outlet for further extracting energy from said fluid.

11. A generator according to claim 10 including means regeneratively heating the fluid between said outlet and said inlet.

12. A generator according to claim 10 including means for adding heat to the system between said outlet and said inlet.

13. A magnetohydroelectric generator comprising an elongated duct forming a main passage, means for inducing a flow of an electrically conductive gaseous fluid stream through said duct at supersonic velocity, a first means adjacent said duct for inducing a pulsating magnetic field which passes through the fluid stream to create intermittent fluid bunching in said stream, thereby providing spaced bits or perturbations which travel in a downstream direction, and a second means for inducing a second pulsating magnetic field passing through the fluid stream and located a predetermined distance downstream of said first-mentioned field-producing means, said stream passing through said second field whereby said stream interacts with said second field and exchanges energy therewith.

14. A generator according to claim 13 including a source of A.C. power connected to said first and second means and means for transferring energy to said stream from both said means.

15. A magnetohydroelectric generator including an elongated electrically insulated duct having an inlet and outlet, a source of high-temperature gaseous fluid comprising a rocket combustion chamber for conducting said fluid from said source to said duct at supersonic velocity to provide an electrically conductive stream, a first coil providing a first magnetic field passing through said stream, means for pulsing said first magnetic field to induce in said stream a flow having pulsed characteristics, a second coil downstream of said first coil and providing a second magnetic field which intercepts said pulsed flow, said second magnetic field being at least partially displaced by said pulsed flow to induce in said second coil a pulsed electromotive force, load means receiving current produced by said electromotive force, and an exhaust nozzle downstream of said outlet.

References Cited in the file of this patent
UNITED STATES PATENTS

| | | |
|---|---|---|
| 2,807,212 | Lindenblad | Sept. 24, 1957 |
| 2,981,193 | Carlson | Apr. 25, 1961 |
| 2,988,997 | Elrod | June 20, 1961 |